United States Patent [19]
Guhl et al.

[11] Patent Number: 6,055,783
[45] Date of Patent: May 2, 2000

[54] UNITARY INSULATED GLASS UNIT AND METHOD OF MANUFACTURE

[75] Inventors: James Curtis Guhl, Hudson, Wis.; Steven Matthew Johnson, Minneapolis, Minn.

[73] Assignee: Andersen Corporation, Bayport, Minn.

[21] Appl. No.: 08/929,885

[22] Filed: Sep. 15, 1997

[51] Int. Cl.⁷ .................................. E06B 1/18; E06B 1/22
[52] U.S. Cl. ........................ 52/204.62; 156/109; 428/34; 52/172; 52/786.1
[58] Field of Search ..................... 156/109, 108; 428/34; 52/171.1, 204.52, 783.1, 786.1, 786.13, 204.6, 204.62, 172

[56] References Cited

U.S. PATENT DOCUMENTS

| | | |
|---|---|---|
| 309,636 | 12/1884 | Mann . |
| 1,605,583 | 11/1926 | Heymer . |
| 1,853,317 | 4/1932 | Packer . |
| 2,029,541 | 2/1936 | Martinson . |
| 2,050,733 | 8/1936 | Ross . |
| 2,052,244 | 8/1936 | Pertz . |
| 2,132,217 | 10/1938 | Neuendorf . |
| 2,246,075 | 6/1941 | Phillips et al. . |
| 2,607,453 | 8/1952 | Smith . |
| 3,203,053 | 8/1965 | Lane et al. . |
| 3,573,149 | 3/1971 | Tibble et al. . |
| 3,881,290 | 5/1975 | Bouchey . |
| 3,919,023 | 11/1975 | Bowser et al. . |
| 4,015,394 | 4/1977 | Kessler ........................................ 52/616 |
| 4,027,443 | 6/1977 | Briggs . |
| 4,109,432 | 8/1978 | Pilz . |
| 4,259,135 | 3/1981 | Kulla . |
| 4,407,105 | 10/1983 | Frank . |
| 4,459,789 | 7/1984 | Ford . |
| 4,472,914 | 9/1984 | DeBoef et al. . |
| 4,615,159 | 10/1986 | Kessler . |
| 4,856,243 | 8/1989 | Ault et al. .................................. 52/304 |
| 4,984,402 | 1/1991 | Davies ....................................... 52/398 |
| 5,033,249 | 7/1991 | Scheeren et al. .......................... 52/790 |
| 5,106,663 | 4/1992 | Box ............................................ 428/34 |
| 5,125,195 | 6/1992 | Brede ......................................... 52/171 |
| 5,131,194 | 7/1992 | Anderson . |
| 5,286,537 | 2/1994 | Oita et al. .................................. 428/34 |
| 5,503,884 | 4/1996 | Meyer et al. .............................. 428/34 |
| 5,509,984 | 4/1996 | Meyer et al. ............................. 156/107 |
| 5,510,416 | 4/1996 | Meyer et al. ............................. 524/528 |
| 5,512,341 | 4/1996 | Newby et al. . |
| 5,636,484 | 6/1997 | DeBlock . |
| 5,653,073 | 8/1997 | Palmer . |
| 5,770,321 | 6/1998 | Hartig et al. ............................. 428/622 |

FOREIGN PATENT DOCUMENTS

| | | |
|---|---|---|
| 28 09 682 A1 | 9/1979 | Germany . |
| 31 48 345 A1 | 6/1983 | Germany . |

*Primary Examiner*—Michael W. Ball
*Assistant Examiner*—Robert T. Hendrix
*Attorney, Agent, or Firm*—Merchant & Gould P.C.

[57] ABSTRACT

A multi-paned fenestration unit in which the glass panes are manufactured directly into the support structure without first manufacturing an insulated glass unit. The support structure is designed to provide the structural support for the glass panes without a separate spacer.

26 Claims, 6 Drawing Sheets

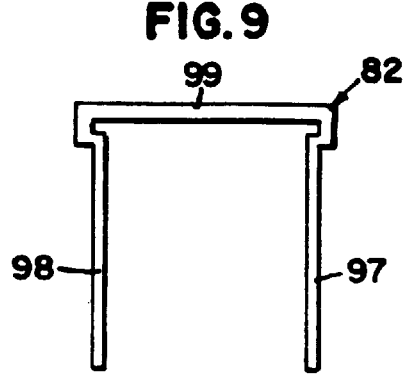
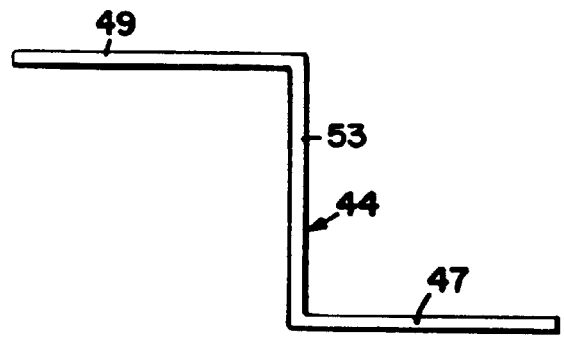
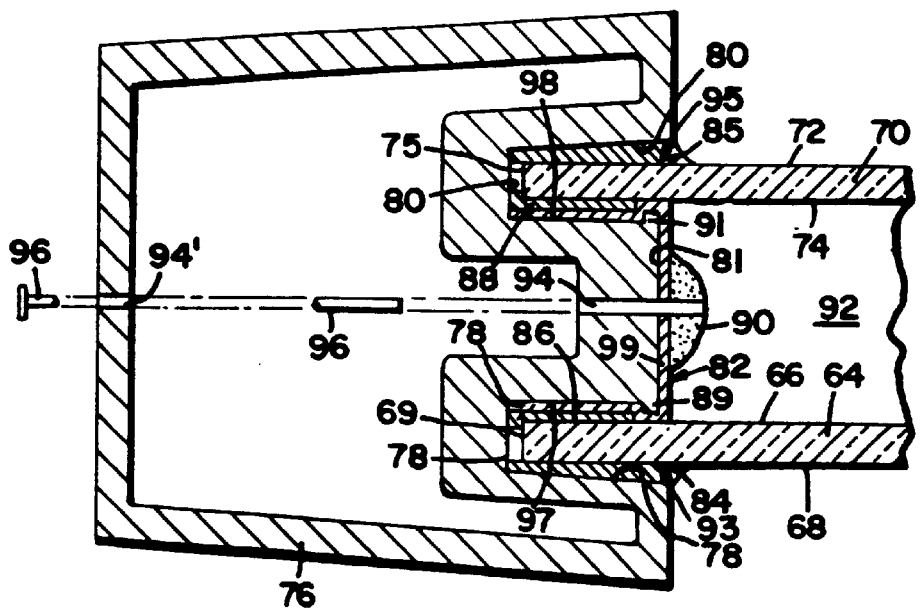

FIG. 6
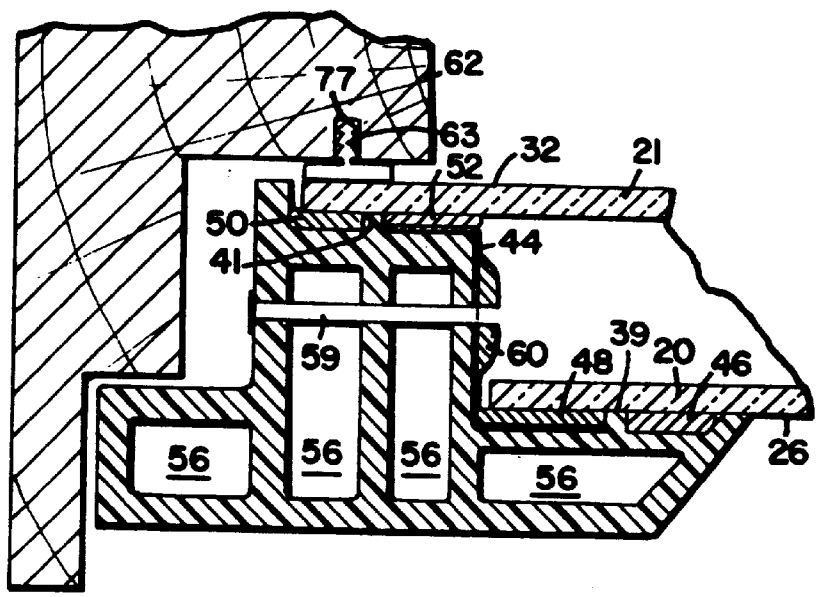
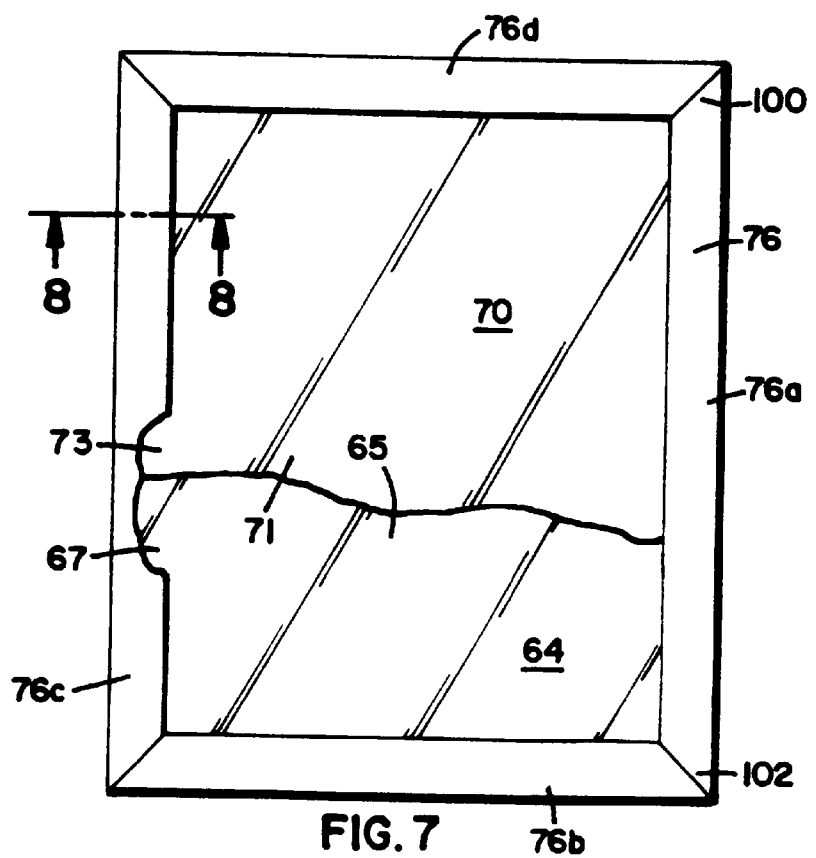
FIG. 7

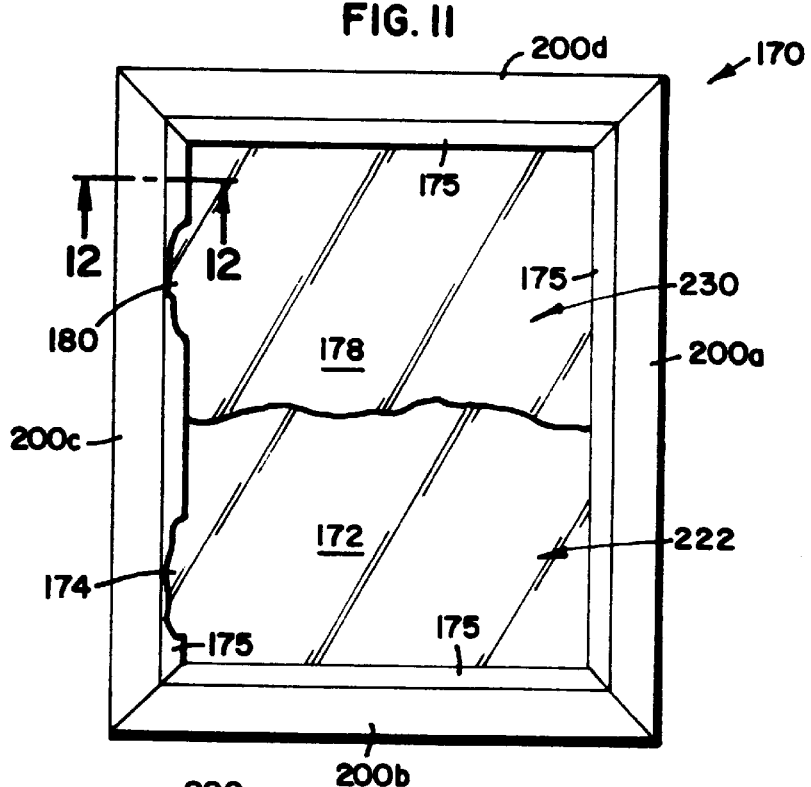

UNITARY INSULATED GLASS UNIT AND METHOD OF MANUFACTURE

BACKGROUND OF THE INVENTION

1. Field of the Invention

This invention relates generally to a fenestration unit which does not include an insulated glass unit (IGU). More specifically, the glass panes are placed directly into the sash without first being permanently and structurally fastened to each other by a spacer. This invention also includes a method for manufacturing a fenestration unit without the utilization of an IGU.

2. Description of the Prior Art

Early fenestration units, including windows and doors, only had a single pane of glass. Typically, the glass would be placed in the sash and then a glazing material would be applied to hold the glass into the sash. However, in more recent times, two or more panes of glass have been utilized in windows for better insulating value. A gap between any two glass panes creates further insulation. The prior art teaches the use of a separate spacer between the two glass panes to structurally support the two panes of glass and also to create such a gap. This combination of two panes of glass with a structural spacer between them resulted in an insulated glass unit which was a separate subassembly from the sash or frame. It did not use any features of the sash or frame to achieve its structural strength, thermal properties or in maintaining the sealed space between the two glass panes.

FIG. 1 illustrates a typical IGU 10 of the prior art. A first glass pane 11 is sealed to one end of spacer 12 with a sealant 14, and a second glass pane 16 is sealed to the other end of spacer 12 with sealant 14. The spacer 12 can be of many different shapes and materials but is often made of aluminum as shown in FIG. 1. It should be noted that the prior art spacers can be hollow and filled with a desiccant. The combination of two or more glass panes separated by a spacer is manufactured as a unit (IGU 10) and then later placed into the sash of the fenestration unit.

FIG. 2 illustrates the IGU 10 after it has been placed in the sash 17 of a fenestration unit.

The prior art fenestration units have a number of problems. Manufacturing involves two operations in which the first operation is manufacturing the IGU and the second operation is placing the IGU in the sash. This dual operation process incorporates significant cost into the fenestration unit. Additionally, this dual operation process typically involves shipping glass from the glass factory to the window manufacturer in the form of an IGU. Such a dual operation process creates a greater potential for glass breakage and the IGU's take up more shipping space than the transport of individual glass panes. Additionally, despite efforts to minimize thermal conductivity through the spacer 12, there continues to be significant heat loss through the spacer 12. There is significant heat loss because the spacer must be thick enough to structurally separate the two panes of glass and a thick spacer conducts more heat than a thin spacer.

SUMMARY OF THE INVENTION

The invention has as its object manufacturing a fenestration unit in one operation wherein the glass panes are placed directly into the sash without the first operation of manufacturing an IGU. The sash (also referred to as the "support structure") of the fenestration unit of this invention provides all of the structural support for the glass panes without the use of a spacer. In other words, the support of the individual glass panes is an integral part of the sash.

The invention provides a method of manufacturing a fenestration unit including the steps of constructing a sash having a first receiving surface and a second receiving surface, depositing a sealant on the first and second glass receiving surfaces, placing a first glass pane onto the sealant on the first receiving surface such that the first glass pane is structurally supported by the sash, and placing a second glass pane on the second receiving surface such that the second glass pane is structurally supported by the sash.

The invention also includes a fenestration unit comprising at least a first glass pane and a second glass pane and optionally more than two glass panes. Both glass panes have an inside surface and an outside surface such that the inside surfaces face each other. The fenestration unit also includes a sash having a first receiving surface and a second receiving surface. The first receiving surface of the sash receives the outside surface of the first glass pane and the second receiving surface receives the inside surface of the second glass pane. There is no separate structural spacer between the two panes of glass.

The invention also includes a second embodiment of the fenestration unit in which the first receiving surface receives the inside and outside surfaces of the first glass pane and the second receiving surface receives the inside and the outside surfaces of the second glass pane.

A third embodiment is similar to the second embodiment except that the sash comprises three sash sections which are connected to form an integral support structure.

A fourth embodiment of the fenestration unit has a first receiving surface which receives the inside surface of the first glass pane and a second receiving surface which receives the inside surface of the second glass pane.

The invention further provides for methods of manufacturing all of the above embodiments of the fenestration unit.

BRIEF DESCRIPTION OF THE DRAWINGS

FIG. 5 is a cross sectional view of the vapor barrier of the first embodiment.

FIG. 6 is a cross-sectional view of the first embodiment of the invention and a window frame in a casement application.

FIG. 7 is a frontal view of the fenestration unit of a second embodiment of the invention including a partial cut-away.

FIG. 8 is a cross-sectional view of the second embodiment of the invention taken along a line 8—8 of FIG. 7.

FIG. 9 is a cross-sectional view of the vapor barrier of the second embodiment.

FIG. 11 is a frontal view of the fenestration unit of a fourth embodiment of the invention.

FIG. 12 is a cross-sectional view of a fourth embodiment of the invention taken along the line 12—12 of FIG. 11.

DETAILED DESCRIPTION OF THE PREFERRED EMBODIMENTS

In the following description of the preferred embodiment, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
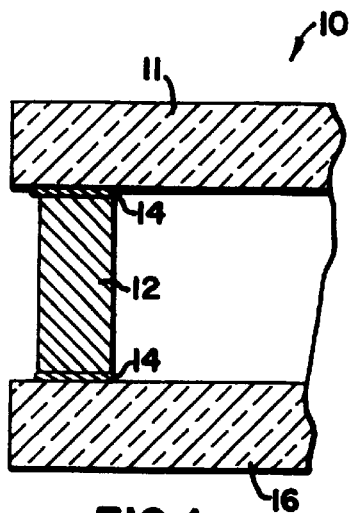
FIG. 1 is a cross-sectional view of a prior art IGU.
Figure 2:
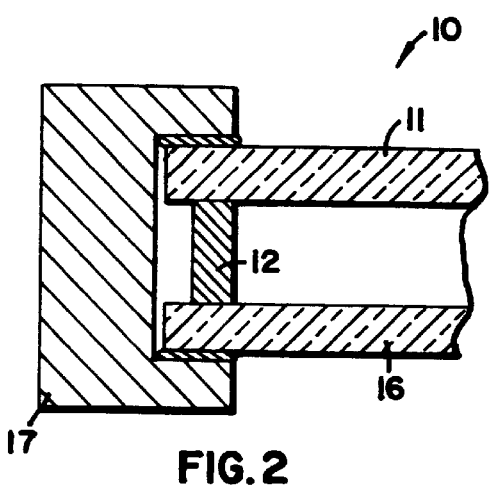
FIG. 2 is a cross-sectional view of an IGU of the prior art inserted into a sash.
Figure 3:
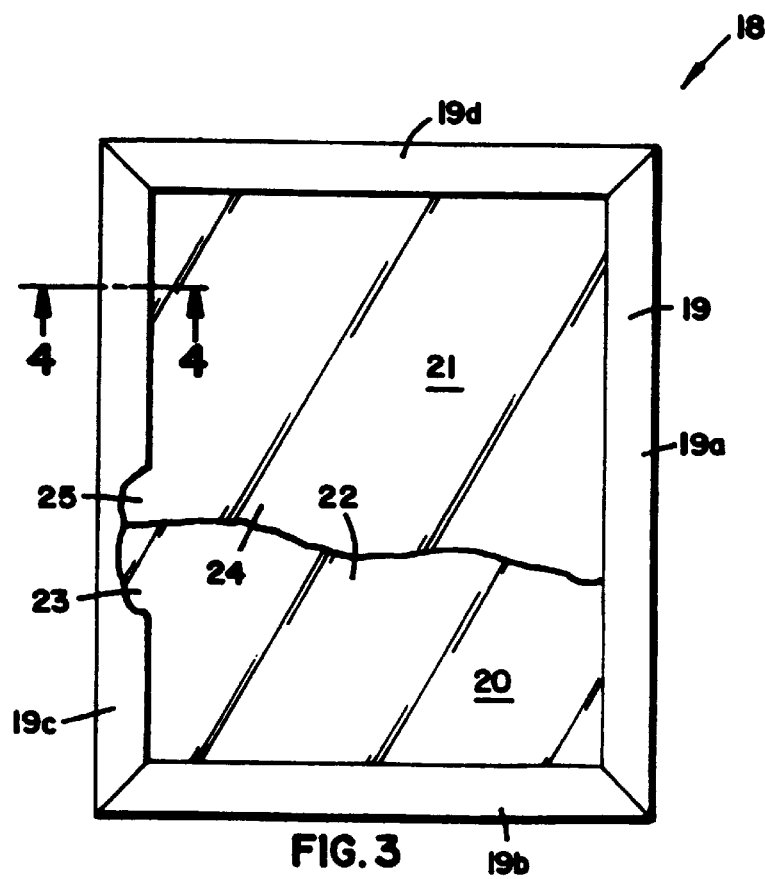
FIG. 3 is a frontal view of the fenestration unit of the first embodiment of the invention including a partial cut-away.

FIG. 3 generally illustrates a fenestration unit 18 of the first embodiment of the invention. The fenestration unit 18 includes a sash 19 which could also be a window or door frame on a stationary (non-ventilating unit). The use of the term "sash" is not intended to be limited to a strict sense of the word, but instead is defined as any structure that supports or holds a transparent material such as a glass pane. Therefore, the term "sash" will be used throughout this detailed description of the preferred embodiments, but it is understood to include a typical sash as well as any suitable support structure. The sash 19 includes four sash members 19a, 19b, 19c and 19d and is rectangular in shape. However, the sash members do not have to be lineal and the sash 19 could be any shape. Construction of the sash 19 involves constructing the sash members 19a–d and then fastening the sash members 19a–d together to create the sash 19. The sash members 19a–d can be constructed by extrusion, wood milling or any other suitable manufacturing technique. The four sash members 19a–d can be fastened together in any manner known in the art. For example, depending on the type of material used for the sash 19, the lineal sash members 19a–d could be connected together by fasteners, corner keys, thermal welding, vibratory welding, ultrasonic welding, adhesives, or by any other method known in the art.

The sash 19 supports the first glass pane 20 and second glass pane 21. There is no separate spacer for structurally supporting the glass panes. The structural support is provided entirely by the sash 19. The first glass pane 20 has an inner portion 22 and a border portion 23 (as seen through the cut-away portion of the sash 19). The border portion 23 is the portion around the periphery of the first glass pane 20, i.e., the portion proximate to the sash 19. In a preferred embodiment, the border portion 23 extends from the edge 30 of the first glass pane 20 to about one inch from the edge 30 in the direction of the interior portion 22 of the first glass pane 20. The inner portion 22 is the portion of the first glass pane 20 which is not part of the border portion 23 and which is therefore a further distance from the sash 19. The second glass pane 21 also has an inner portion 24 and a border portion 25 (also shown in the cut-away portion of the sash 19). The inner portion 24 and the border portion 25 are defined the same as above for the first glass pane 20. The outside surface 26 of the first glass pane 20 faces the outdoors. The outside surface 32 of the second glass pane 21 faces the indoors.

Figure 4:
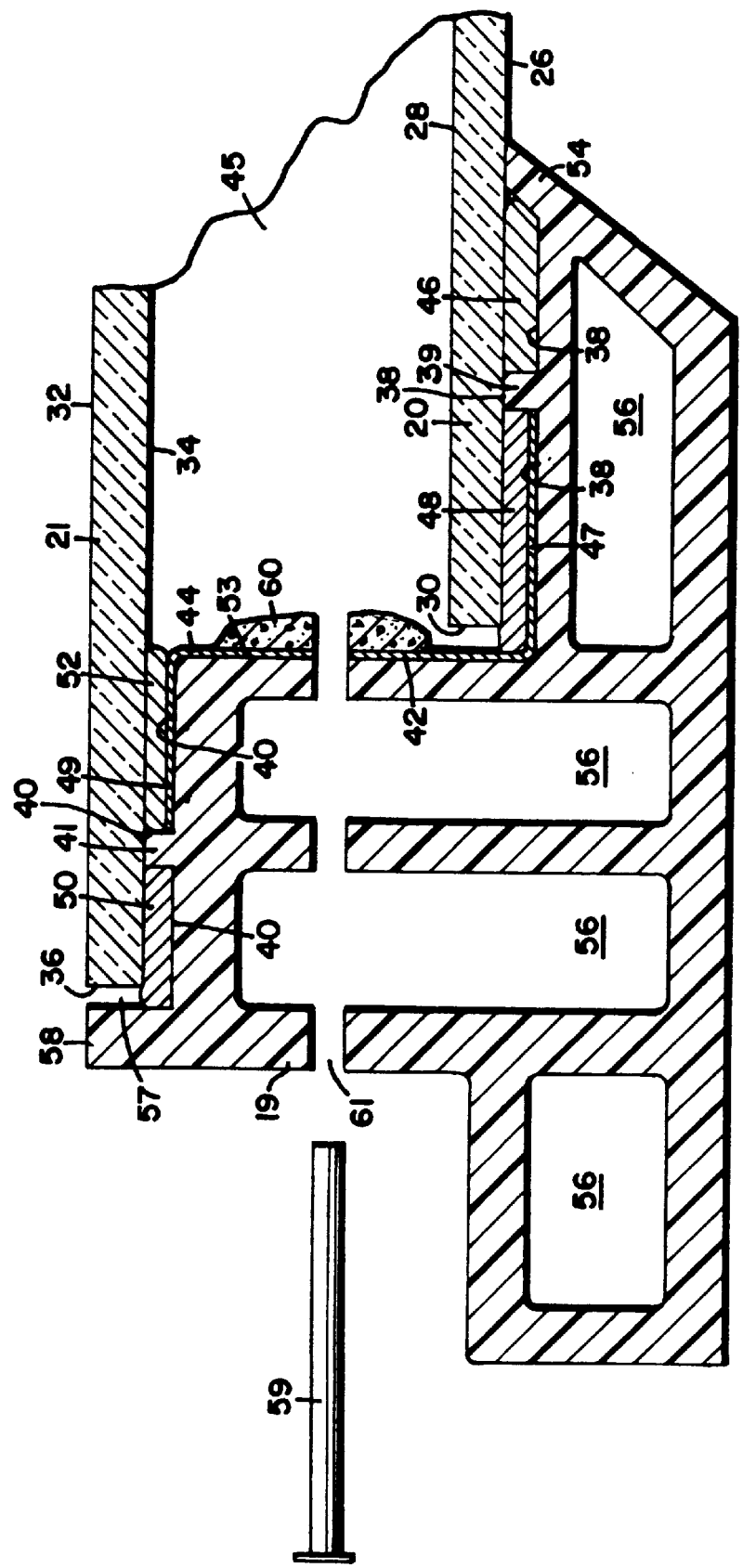
FIG. 4 is a cross-sectional view of a first embodiment of the invention taken along the lines 4—4 of FIG. 3.

FIG. 4 is a cross-sectional view of the first embodiment of the invention taken along the lines 4—4 of FIG. 3. The first embodiment is referred to as bed glazing. In bed glazing the glass panes are set into the sash in a top down manner as opposed to being slid into a groove.

The first embodiment will now be described. The first glass pane 20 includes an outside surface 26, an inside surface 28 and an edge 30. The second glass pane 21 includes an outside surface 32, an inside surface 34 and an edge 36.

The sash 19 may be made of any low-thermally conducting material. For example, the sash 19 could be hollow or solid; made from a variety of materials, including, but not limited to metal, wood, clad wood, thermoplastic, thermoset, or a composite material. Alternatively, the sash could be made of Fibrex™ material which is a wood fiber and polyvinyl chloride(PVC) composite patented by Andersen Corporation (See U.S. Pat. Nos. 5,406,768; 5,497,594; 5,441,801; 5,518,677; 5,486,553; 5,539,027). The sash 19 could be made by milling, molding, extruding, pultruding or any other method.

The sash 19 includes a first receiving surface 38 for receiving the first glass pane 20, a second receiving surface 40 for receiving a second glass pane 21 and an interior surface 42 between the first and second receiving surfaces. The receiving surfaces 38 and 40 could be any planar or nonplanar surface which structurally supports the glass through direct contact with the glass or through indirect contact with the glass through an adhesive or sealant.

It is important to prevent gas molecules from migrating from the sash 19 into the space 45 between the first glass pane 20 and the second glass pane 21. Such gas molecules in the space 45 interfere with the clarity of the fenestration unit 18. A vapor barrier which can come in many different forms serves the function of preventing migration of molecules into the space 45. The vapor barrier may be integral with the sash 19. For example the sash 19 could be made of a material such that outgassing from the sash 19 is prevented in which case the vapor barrier and the sash are one and the same. Alternatively, the vapor barrier could be a very thin coating which is applied to the interior surface 42 of the sash 19, for example by spraying it onto the interior surface 42. The vapor barrier could be non-metallic such as plastic or ceramic or it could be metallic such as steel or aluminum.

In the embodiment shown in FIG. 4 the vapor barrier 44 is a thin foil or strip of metal or plastic or ceramic. For example, the vapor barrier 44 could be aluminum, ceramic or plastic. The vapor barrier 44 has a first leg 47 at one end of the vapor barrier 44 and a second leg 49 at the opposite end of the vapor barrier 44 and an interior portion 53. The interior portion 53 is located between the first leg 47 and the second leg 49. The first leg 47 is attached to the first receiving surface 38, the second leg 49 is attached to the second receiving surface 40 and the interior portion 53 of the vapor barrier 44 is attached to the interior surface 42 of the sash 19. The vapor barrier 44 is illustrated in FIG. 4. The vapor barrier is preferably made as thin as possible to reduce the conduction of heat through the vapor barrier and yet thick enough to prevent outgassing. Another advantage of a thin vapor barrier is reduced material cost. A stainless steel vapor barrier 44 must be at least about 0.001" (inches) thick in order to effectively reduce the movement of gas molecules from the sash 19 to the space 45. It is sometimes desired to use a vapor barrier 44 that is between about 0.003" (inches) and 0.005" (inches) because such a thickness is easier to apply to the sash 19 without tearing or destroying the vapor barrier 44. The vapor barrier may also be applied to the interior surface 42, the first receiving surface 38 and the second receiving surface 40 by a spray-on coating. The vapor barrier 44 may be affixed to the sash 19 by an adhesive or by mechanical means. It is also within the scope of this invention to merely place a vapor barrier, in the form of a strip, without an adhesive, on the interior surface 42, the first receiving surface 38 and the second receiving surface 40. Then the sealants and glass panes are placed as shown in FIG. 4 and described below to permanently hold the vapor barrier 44 in place. Alternatively, the vapor barrier could be designed to snap into place such that it is held in place by a friction fit.

The various sealants and their functions will now be described. The portion of the outside surface 26 of the border portion 23 of the first glass pane 20 that is not situated over the vapor barrier 44 is attached to the first receiving surface 38 by a first secondary sealant 46. The function of the first secondary sealant 46 is to provide an adhesive bond between the first glass pane 20 and the sash 19. This adhesive bond is structural and prevents the first glass pane 20 from breaking away from the sash 19 in strong winds. The first secondary sealant 46 also prevents water from flowing along the outside surface 26 of the first glass pane 20 and into the space 45. GE 2512 by General Electric Company is used as first secondary sealant 46 but other adhesives known in the art for attaching glass to the sash material may also be used. For example, hot melt butyl, polyisobutylene and other sealants can be used as secondary sealants. It should also be understood that the first and second secondary sealants could be a combination adhesive and sealant. The portion of the outside surface 26 of the border portion 23 that is situated over the vapor barrier 44 is attached to the vapor barrier 44 by a first primary sealant 48. The function of the first primary sealant 48 is to prevent migration of air or argon or any other insulating gas from the space 45 to the world outside the space 45 and to prevent gases, especially water vapor, from migrating from outside the space 45 into the space 45 which could cause condensation between the two glass panes. The first primary sealant 48 could be any compound that prevents such migration such as, for example, polyisobutylene. It is within the scope of this invention to use one adhesive/sealant in place of first secondary sealant 46 and first primary sealant 48. The single adhesive would perform a dual function of structurally supporting the glass panes and sealing the space 45.

The portion of the inside surface 34 of the border portion 25 of the second glass pane 21 that is not situated over the vapor barrier 44 is attached to the second receiving surface 40 by a second secondary sealant 50 which is the same as and performs substantially the same function as the first secondary sealant 46. The portion of the inside surface 34 of the border portion 25 of the second glass pane 21 that is situated over the vapor barrier 44 is attached to the vapor barrier 44 by a second primary sealant 52. The second primary sealant 52 is the same as and performs substantially the same function as the first primary sealant 48.

The depositing of the secondary sealants 46 and 50 and the primary sealants 48 and 52 may be accomplished by hand or using a machine. For example, a caulk gun could be used to deposit the various sealants. Robotic machines are also known in the art for depositing sealants in a specified pattern. Another option is to apply the sealants in-line by an extrusion process.

A dual sealant system in which the primary sealant is distinct from the secondary sealant, has been described above. It is noted, however, that a single sealant system, in which the primary and secondary sealants are incorporated into one compound, is within the scope of this invention and could be used with any of the embodiments.

The first receiving surface 38 may include a lip 54 which is a portion that is raised from the remainder of the first receiving surface 38. The lip 54 provides a space between the first glass pane 20 and the first receiving surface 38 such that the first secondary sealant 46 and the first primary sealant 48 are not squeezed out from between the first glass pane 20 and the first receiving surface 38, thereby preventing a messy appearance along the interface between the sash 19 and the inner portion 22 of the outside surface 26 of the first glass pane 20.

The first receiving surface 38 may also include a stop 39 which is a portion of the sash 19 which is raised. The necessity of the stop 39 depends on the compatibility of the first primary sealant 48 and the first secondary sealant 46. If the first primary sealant 48 and the first secondary sealant 46 are one compound or they are two compatible compounds, then the stop 39 is unnecessary. If, however, the first primary sealant 48 and the first secondary sealant 46 are incompatible, then the stop 39 prevents the commingling of these two sealants. Because the first receiving surface 38 includes the lip 54, the stop 39 is unnecessary for maintaining a gap between the first receiving surface 38 and the first glass pane 20.

The sash 19 includes a flange 58 adjacent to the edge 36 of the second glass pane 21. The flange 58 provides guidance to the proper placement of the second glass pane 21. There is a gap 57 between the edge 36 of the second glass pane 21 and the flange 58. The purpose of the gap 57 is to allow the thermal expansion and contraction of the second glass pane 21 and to allow for permanent shrinkage of the sash 19.

The second receiving surface 40 includes a stop 41 which is a portion of the sash which is raised. The stop 41 creates a gap between the second glass pane 21 and the second receiving surface 40 such that the second secondary sealant 50 and the second primary sealant 52 can remain in that gap without being squeezed out. The stop 41 is located at the end of the vapor barrier 44 and the stop 41 therefore forms the juncture between the second secondary sealant 50 and the second primary sealant 52. Therefore, if the second secondary sealant 50 and the second primary sealant 52 are incompatible, the stop 40 additionally functions to prevent commingling of the two sealants.

An alternative embodiment not shown in the Figures includes a resilient setting block which is placed between the flange 58 and the edge 36 and another such setting block between the interior surface 42 and the edge 30 of the first glass pane. The purpose of a resilient setting block is to absorb the differential expansion and contraction of the glass and sash.

A desiccant removes moisture from the surrounding area. For fenestration units it is important to remove as much moisture as possible from the space 45 between the two glass panes. Desiccants can come in many different forms and materials and the scope of this invention is not limited by the type of desiccant utilized. For example, the desiccant could be a molecular sieve bead type desiccant. A desiccant material 60 may be attached to the interior portion 53 of the vapor barrier 44 by an adhesive. Alternatively, the desiccant 60 can be an extruded hot melt adhesive that is adhered to the interior portion 53 of the vapor barrier 44. The desiccant material 60 assists in the removal of moisture from the space 45. The desiccant material 60 could alternatively be an adhesive type desiccant as described in U.S. Pat. Nos. 5,510,416; 5,509,984; and 5,503,884 owned by H. B. Fuller Licensing & Financing, Inc.

The space 45 contains a thermally insulating gas. For example, air, Argon or Krypton or some combination of these three gases could be used. If air is used, then the manufacture of the fenestration unit 18 is simplified, because the desiccant 60 will remove moisture from the space 45 and no steps are necessary to remove the air and replace it with another gas. The description below discusses filling the space 45 with Argon as an example. The description also applies to other gases that may be used.

Filling the space 45 with Argon involves the following steps. First, the sash 19 is constructed with a hole or multiple holes that connect the space 45 to the outside air. An example hole is shown as hole 61. A hose can be inserted into this hole and the air sucked out of the space 45 through the hose. Then Argon can be inserted into the space 45 through the same hose that passes through hole 61. Alternatively, one or more holes 61 may be used to remove the air while Argon is inserted into the space 45 through one or more other holes also similar to hole 61. Other methods of inserting Argon into the space 45 may be used. Once the space 45 is filled with Argon, then the plug 59, shown in exploded view for clarity, is inserted in the hole 61 to seal the space 45. There could be multiple holes 61 and plugs 59 per sash 19. The plug 59 can be maintained in the hole 61 by any method including a friction fit or use of an adhesive.

The second secondary sealant 50 and the second primary sealant 52 may be visible through the second glass pane 21. Therefore, it may be desirable to place a decorative trim piece or coating along surface 32 of the border portion of the second glass pane 21 to hide the sealants from view.

The sash shown in FIG. 4 defines hollowed portions 56 which allow for a lighter weight and lower cost sash 19 while retaining structural integrity and excellent insulating properties. However, the invention is not limited to this configuration. A sash defining more or fewer hollowed portions or no hollowed portions or differently shaped hollowed portions would also be within the scope of the invention. For example, if the sash 19 was made of milled wood, then it would not likely include the hollowed portions 56.

The manufacture of the embodiment shown in FIG. 4 will now be described. First, the sash 19 including the first receiving surface 38 and the second receiving surface 40 is constructed. The construction of the sash 19 includes joining the members 19a–d. Next, the vapor barrier is placed on the interior surface 42, a portion of the first receiving surface 38 and a portion of the second receiving surface 40. As discussed above, the vapor barrier 44 may be attached to the sash 19 by mechanical means or by an adhesive. A desiccant as described above is then attached to the portion of the vapor barrier 44 that is adjacent to the interior surface 42 of the sash 19. The first secondary sealant 46 is deposited on the portion of the first receiving surface 38 that is not in contact with the vapor barrier 44. The second secondary sealant 50 is deposited on the portion of the second receiving surface 40 that is not in contact with the vapor barrier 44. Next, the first primary sealant 48 is deposited on the first leg 47 of the vapor barrier 44. The second primary sealant 52 is deposited on the second leg 49 of the vapor barrier 44. The next step is to place the border portion 23 of the outside surface 26 of the first glass pane 20 onto the first receiving surface 38 such that the border portion 23 of the outside surface 26 of the first glass pane 20 sits on the first secondary sealant 46 and the first primary sealant 48. There should be a gap between the edge 30 and the interior surface 42 of the sash 19. Next, the border portion 25 of the inside surface 34 of the second glass pane 21 is placed on the second receiving surface 40 such that the border portion 25 of the inside surface 34 of the second glass pane 21 sits on the second secondary sealant 50 and the second primary sealant 52. There should be a gap 57, or alternatively a resilient setting block, between the edge 36 and the flange 58. Finally, the space 45 is filled with a thermally insulating gas through the hole 61 as described above and a decorative trim piece or coating is added if necessary.

It should be noted that the above manufacturing steps are of significant advantage over the prior art manufacturing methods. In the prior art one had to first manufacture an IGU which involved sealants and adhesives and then one had to further incorporate that IGU into the sash. This invention allows one to actually manufacture the glass panes directly into the sash without the extra step of making an IGU. This is a great advantage resulting in not only a better product but also reduced costs and time in manufacturing the fenestration units. Many different embodiments including the bed glazing, groove glazing and hybrid glazing embodiments disclosed in this specification utilize this significant advantage.

FIG. 6 is similar to FIG. 4 with the addition of a frame 62 that would be used for a casement window. The outside surface 26 of the first glass pane 20 faces the outdoors. The outside surface 32 of the second glass pane 21 faces the indoors.

In FIG. 6, the plug 59 is shown inserted into the sash assembly. A flexible bulbed weatherstrip 63 is attached to the frame 62. When the casement window is in a closed position as shown in FIG. 6, the flexible bulbed weatherstrip 63 is in contact with the outside surface 32 of the second glass pane 21. The sash 19 may be rotated outward away from the frame 62 as is typical of a casement window. In such a case, the outside surface 32 of the second glass pane 21 moves away from the flexible bulbed weatherstrip 63. The purpose of the flexible bulbed weatherstrip 63 is to seal the window to prevent air and water from traveling between the frame 62 and the sash 19 when the window is in its closed position.

The manufacture of the structure shown in FIG. 6 is the same as for the structure shown in FIG. 4 with the additional step of placing the flexible bulbed weatherstrip 63 into a groove 77 in the frame 62. The weatherstrip 63 is friction fit into the groove 77 so that the weatherstrip 63 will not fall out of the groove 77. Alternatively, an adhesive could be placed in the groove 77 to more securely fasten the weatherstrip 63 in the groove. The groove 77 is located such that weatherstrip 63 is adjacent the second glass pane 21 when the window is in the closed position as shown in FIG. 6.

A frontal view of the second embodiment of the invention is shown in FIG. 7. The second embodiment is a groove glazing embodiment in which the glass panes are placed into a groove in the sash. The sash 76 of the second embodiment is made of four sash members 76a–d. Each sash member has two ends, for example end 100 and end 102 of sash member 76a. The first glass pane 64 has an inner portion 65 and a border portion 67. The second glass pane 70 has an inner portion 71 and a border portion 73. The inner and border portions in this embodiment are defined the same as with respect to the first embodiment described above.

FIG. 8 is a cross-sectional view taken along the lines 8—8 in FIG. 7. Again, in this embodiment as in the first embodiment discussed above, there is not a separate spacer between the two panes of glass and the glass panes are structurally supported entirely by the sash 76.

The first glass pane 64 has an inside surface 66, an outside surface 68 and an edge 69. The second glass pane 70 has an outside surface 72, an inside surface 74 and an edge 75. The inside surface 66 of the first glass pane 64 faces the inside surface 74 of the second glass pane 70.

The sash 76 includes a receiving surface 78 that receives the border portion 67 of the inside surface 66 of the first glass pane 64, and the border portion 67 of the outside surface 68 of the first glass pane 64. The receiving surface 78 could be any planar or nonplanar surface which structurally supports the glass through direct contact with the glass or through indirect contact with the glass through an adhesive or sealant.

Moreover, the sash 76 includes a second receiving surface 80 that receives the border portion 73 of the inside surface 74 of the second glass pane 70, and the border portion 73 of the outside surface 72 of the second glass pane 70.

The sash 76 also includes an interior surface 81 which extends between the first receiving surface 78 and the second receiving surface 80. In this embodiment, the vapor barrier 82 follows the contour of a portion of the first receiving surface 78, the entire interior surface 81 and a portion of the second receiving surface 80. The vapor barrier 82 is made of the same material and performs the same function as the vapor barrier 44 of the first embodiment shown in FIG. 4. The vapor barrier 82 may be attached to the sash 76 by any means including an adhesive, mechanical fasteners and by a snap fit. Alternatively the vapor barrier 82 may be a spray on material or it may be a part of the sash 76.

The first receiving surface 78 is attached to the border portion 67 of the outside surface 68 of the first glass pane 64 by a first secondary sealant 84. The second receiving surface 80 is attached to the border portion 73 of the outside surface 72 of the second glass pane 70 by a second secondary sealant 85. The secondary sealants 84 and 85 are the same and perform the same function as the secondary sealants 46 and 50 of the first embodiment.

The border portion 67 of the inside surface 66 of the first glass pane 64 is attached to the vapor barrier 82 by a first primary sealant 86. The border portion 73 of the inside surface 74 of the second glass pane 70 is attached to the vapor barrier 82 by a second primary sealant 88. The primary sealants 86 and 88 are the same and perform the same function as the primary sealants 48 and 52 of the first embodiment.

The receiving surfaces 78 and 80 may contain stops 89 and 91 respectively, for allowing some space for the first primary sealant 86 and the second primary sealant 88 between the inside surfaces 66 and 74 and the receiving surfaces 78 and 80, respectively. The stops 89 and 91 are raised portions that rise above the remainder of the receiving surfaces. The purpose of the stops 89 and 91 is to prevent the first and second primary sealants 86 and 88 from squeezing out from between the receiving surfaces 78 and 80 and the first and second glass panes 64 and 70 respectively. The receiving surfaces 78 and 80 may be designed without the stops 89 and 91 but then some squeeze out of the primary sealants may occur.

The portions of the receiving surfaces 78 and 80 adjacent to the outside surfaces 68 and 72 of the first and second glass panes 64 and 72 respectively, are angled away from the glass so that the distance from the glass to the sash becomes less, nearer to the edges 69 and 75. The purpose of this angle in the receiving surfaces of the sash is to facilitate the deposition of the first secondary sealant 84 and the second secondary sealant 85 between the sash and the first and second glass panes 64 and 70 respectively. It should be noted however that the present invention is not limited to the described receiving surfaces. The receiving surfaces described above are a preferred embodiment.

In a preferred embodiment the first receiving surface 78 also includes a raised member 93 for applying pressure to the outside surface 68 of the first glass pane 64 to hold the inside surface 66 of the first glass pane 64 in contact with the stop 89. Additionally the second receiving surface 80 includes a raised member 95 for applying pressure to the outside surface 72 of the second glass pane 70 to hold the inside surface in contact with the stop 91.

The raised members 93 and 95 can be any shape which applies the appropriate pressure and should be flexible enough to allow the first secondary sealant 84 and second secondary sealant 85 to pass between it and the adjacent glass pane when such sealants are deposited. In a preferred embodiment the raised member 93 and 95 are rigid PVC.

FIG. 8 also shows the desiccant material 90 attached to the vapor barrier 82 along the interior surface 81 of the sash 76. The purpose and design of the desiccant material 90 is the same as the purpose and design of the desiccant material 60 in the first embodiment of the invention. A desiccant adhesive as described above with respect to the first embodiment may also be used for this embodiment.

Again, with this embodiment as in the first embodiment, either air or Argon or a combination of both may be used to fill the space 92 between the first glass pane 64 and the second glass pane 70. If Argon is used, then a hole 94 may be used to insert a hose for removing air and inserting Argon into the space 92. Once the space 92 is filled or partially filled with Argon, then it may be blocked with a plug 96 which is shown in exploded view for clarity.

Resilient setting blocks may also be used with this embodiment. A resilient setting block could be placed between the edge 69 and the first receiving surface 78 and another setting block could be placed between the edge 75 and the second receiving surface 80.

The manufacture of the second embodiment involves the following steps. First, the sash members 76a–d are constructed. The sash members 76a–d can be made from any of the materials used for the sash members 19a–d of the first embodiment. Second, the vapor barrier 82 is placed on the interior surface 81 of the sash members 76a–d. The vapor barrier 82 can be attached with any means described with respect to the first embodiment. In a preferred embodiment the vapor barrier 82 has a first leg 97, a second leg 98 and an interior portion 99, wherein the interior portion 99 is between the first leg 97 and the second leg 98. The first leg 97 is adjacent to a portion of the first receiving surface 78, the second leg is adjacent to a portion of the second receiving surface 80 and the interior surface 99 of the vapor barrier 82 is adjacent to the interior surface 81 of the sash 76.

The first primary sealant 86 is deposited on the first leg 97 of the vapor barrier 82. The second primary sealant 88 is deposited on the second leg 98 of the vapor barrier 82. Next, the first glass pane 64 is placed onto the first receiving surface 78 including onto the first primary sealant 86. The second glass pane 70 is placed onto the second receiving surface 80 including onto the second primary sealant 88.

The placement of the first and second glass panes 64 and 70 onto the receiving surfaces 78 and 80, respectively, must be coordinated with the fastening of the sash members 76a–d to each other. To do this the first glass pane 64 is placed on a platform or support and the second glass pane 70 is suspended parallel and above the first glass pane 64 with the space between the two glass panes being similar or equal to the space 92 desired in the ultimate fenestration unit. For example, suction cups could be applied to the outside surface 72 of the second glass pane 70 to suspend the second glass pane 70 over the first glass pane 64. The sash members 76a–d are then placed around the first and second glass panes 64 and 70 such that the first receiving surface 78 receives the border portion of the first glass pane 64 and the second receiving surface 80 receives the border portion of the second glass pane 70. The ends of the sash members 76a–d are then fastened together using any means to form a sash 76. For example, depending on the type of material used for the sash 76, the lineal sash members 76a–d could be connected together by fasteners, corner keys, thermal welding, vibratory welding, ultrasonic welding, adhesives, or by any other method known in the art. The resulting sash 76 as shown is rectangular in shape, but it could be any shape. After the glass panes are placed onto the receiving surfaces, the next step is to apply or deposit a fillet bead (the first and second secondary sealants 84 and 85) into the space between the receiving surfaces 78 and 80 and the outside surfaces 68 and 72 of the border portions 67 and 73 of the first and second glass panes 64 and 70 respectively. The application or deposition of the first and second secondary sealants 84 and 85 can be accomplished by any method including but not limited to injecting. The angle in the receiving surfaces 78 and 80 of the sash assists in the deposition process by allowing easy application of the secondary sealants between the glass and the sash. The depositions, for both the primary and secondary sealants, can be done manually using a caulk gun or automatically with a machine or robot. As the secondary sealants 84 and 85 are deposited into the space between the glass and the receiving surface, the raised members 93 and 95 bend to allow the secondary sealants to pass between the raised members 93 and 95 and the outside surfaces 68 and 72 and in the direction of the edges 69 and 75 respectively.

It is noted that the order of the above steps is not critical to the invention. For example, the secondary sealants could be placed on the receiving surfaces prior to the placement of the glass panes on the receiving surfaces. The use of the deposition technique after the glass is placed in the sash is a preferred technique because it prevents the secondary sealants from being displaced by the placement of the glass panes on the receiving surfaces.

Figure 10:
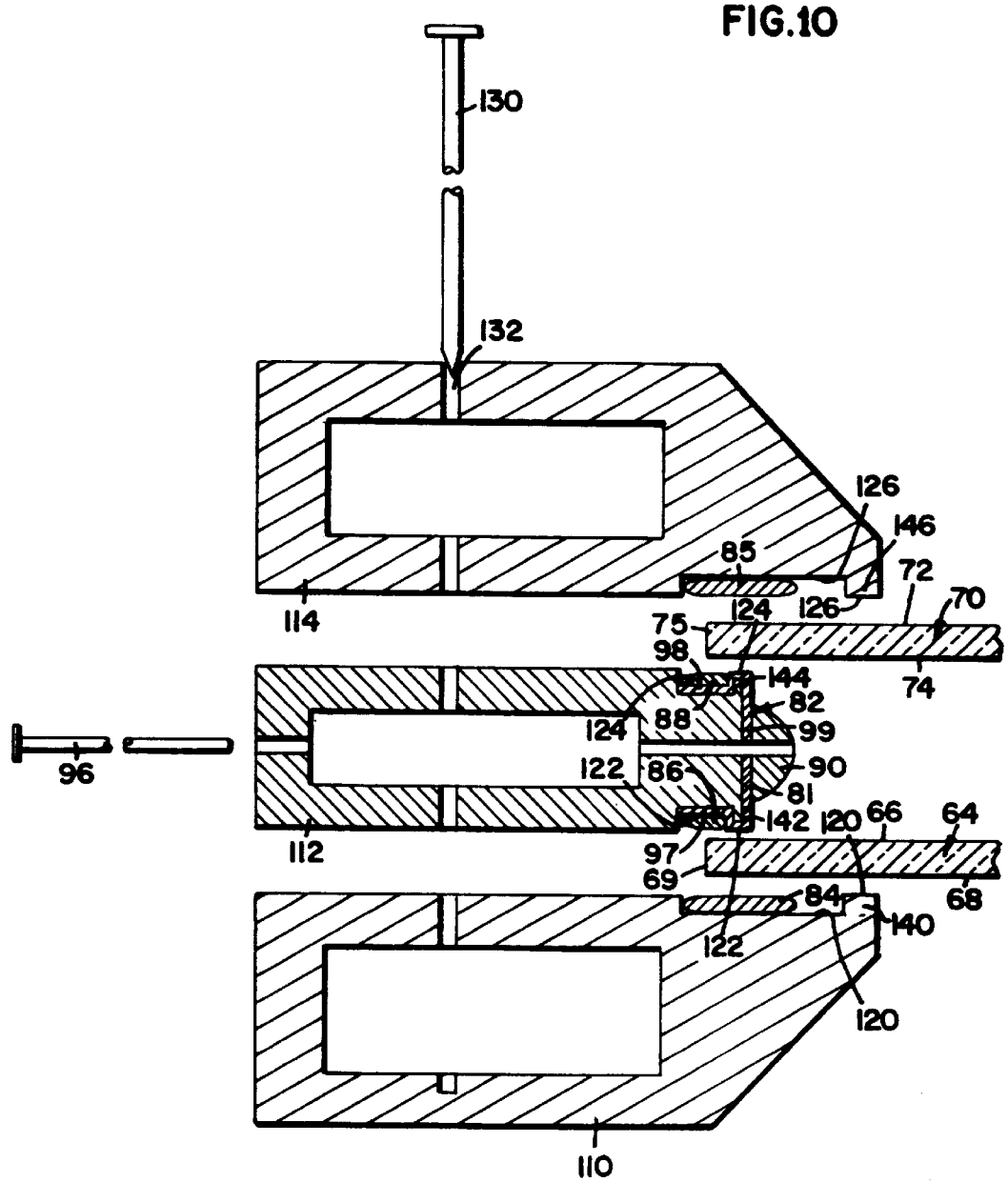
FIG. 10 is a cross-sectional exploded view of a third embodiment of the invention.

A third embodiment of the invention is shown in exploded view in FIG. 10. This embodiment is a hybrid embodiment which is similar to the second embodiment shown in FIG. 8 with the difference being that the sash in the third embodiment is three sash sections 110, 112 and 114. These three sash sections are connected together to form one sash which structurally supports the glass panes. The result is that the third embodiment utilizes a top down assembly for what is in the end a groove glazing structure. This third embodiment has the added benefit of optionally having different colors or even different materials for the interior and exterior trim pieces (i.e., sash section 110 can be a different material and/or color from sash section 114).

After the parts are assembled together the first receiving surface 120 of the first sash section 1 10 is adjacent to the outside surface 68 and a portion of the edge 69. The second receiving surface 122 of the second sash section 112 is adjacent to the inside surface 66 and a portion of the edge 69. The third receiving surface 124 located on the second sash section 112 is adjacent to the inside surface 74 and a portion of the edge 75. The fourth receiving surface 126 of the third sash section 114 is adjacent to a portion of the edge 75 and the outside surface 72.

If the sash is rectangular, then there are four first sash sections, four second sash sections and four third sash sections. One of the advantages of using first, second and third sash sections 110, 112 and 114 is that manufacturing is accomplished in a bed formation in which one layer is placed on top of the other. The manufacturing steps are described below.

First, the three sash sections 110, 112 and 114 are assembled. For a rectangular window, this assembly comprises connecting the four first sash section lineals to each other at the corners to form a rectangular frame. The connection can be by any of the methods described above including, but not limited to, hot plate welding, vibratory welding or the use of a mechanical fastener. This rectangular flame is referred to in whole as the first sash section 110. The same assembly process is performed to assemble the second and third sash sections 112 and 114. Next, the vapor barrier 82 is placed on the interior surface 81, on the second receiving surface 122 and on the third receiving surface 124. Then the desiccant material 90 is placed on the interior surface 81 of the second sash section 112.

A first secondary sealant 84 is deposited on the first receiving surface 120. Alternatively, the first secondary sealant 84 can be deposited on the border portion 67 of the outside surface 68 of the first glass pane 64. Then the border portion 67 of the outside surface 68 of the first glass pane 64 is placed on the first receiving surface 120. A first primary sealant 86 is deposited on the portion of the vapor barrier 82 that is adjacent to the second receiving surface 122. Alternatively, the first primary sealant 86 can be deposited on the border portion 73 of the inside surface 66 of the first glass pane 64. Next, the second sash section 112 is lowered onto the first sash section such that the portion of the vapor barrier 82 that is adjacent to the second receiving surface 122 is placed on the border portion 73 of the inside surface 66 of the first glass pane 64. A second primary sealant 88 is deposited on the portion of the vapor barrier 82 that is adjacent to the third receiving surface 124. Alternatively, the second primary sealant 88 may be deposited on the border portion 73 of the inside surface 74 of the second glass pane 70. Then the border portion 73 of the inside surface 74 is placed on the portion of the vapor barrier 82 adjacent to the third receiving surface 124. A second secondary sealant 85 is deposited on the fourth receiving surface 126. Alternatively, the second secondary sealant 85 may be deposited on the border portion 73 of the outside surface 72. The fourth receiving surface 126 is then placed on the border portion 73 of the outside surface 72.

The stops 140, 142, 144 and 146 are part of the first, second, third and fourth receiving surfaces, respectively, and are raised portions which serve the same function as the stops 89 and 91 in the second embodiment described above. The stops 140, 142, 144 and 146 can be any shape and it is within the scope of this invention to have receiving surfaces without stops.

Similarly to the other embodiments, a resilient setting block may be placed between the edge 69 and the sash 110 and also between the edge 75 and the sash 110. The purpose of these setting blocks is the same as discussed above with respect to the other embodiments.

The three sash sections 110, 112 and 114 may be connected together by any method including by an adhesive, snap fits or by use of mechanical fasteners or any combination of these connecting methods. FIG. 10 shows a screw 130 which fits into the hole 132 which extends through the third and second sash sections 114 and 112 and partially into the first sash section 110. A number of such screws 130 would be inserted into a corresponding number of holes 132 around the entire sash to connect all three sash sections together. The end result is that the three sash sections 110, 112 and 114 are connected to form one sash which supports the glass panes.

A fourth embodiment of the invention is shown in FIGS. 11–12. The fourth embodiment is a bed glazing embodiment in which one glass pane is placed on the sash from one direction and the other glass pane is placed on the sash from the opposite direction (i.e., the beds are oriented in opposite directions as opposed to the same direction as in the first embodiment).

FIG. 11 generally illustrates a fenestration unit 170 of the invention. The fenestration unit 170 includes a sash 200 which could also be a window or door frame. The sash 200 includes four sash members 200a, 200b, 200c and 200d and is rectangular in shape. However, the sash members do not have to be lineal and the sash 200 could be any shape. Construction of the sash 200 involves constructing the sash members 200a–d and then fastening the sash members 200a–d together to create the sash 200. The sash members 200a–d can be constructed by any process including the examples given above with respect to sash 19 in the first embodiment. The four sash members 200a–d can be fastened together in any manner known in the art including but not limited to those listed above with respect to the first embodiment. For example, depending on the type of material used for the sash 19, the lineal sash members 19a–d could be connected together by fasteners, corner keys, thermal welding, vibratory welding, ultrasonic welding, adhesives, or by any other method known in the art.

The sash 200 supports the first glass pane 222 and second glass pane 230 creating a space 181 between the glass panes. The first glass pane 222 has an inner portion 172 and a border portion 174. The inner portion 172 and the border portion 174 are defined the same as for the prior embodiments. In a preferred embodiment, the border portion 174 (seen through the cut-away of the upper glazing bead 175) extends from the edge 176 of the first glass pane 222 to about one inch from the edge 176 in the direction of the inner portion 172 of the first glass pane 222. The second glass pane 230 also has an inner portion 178 and a border portion 180. The inner portion 178 and the border portion 180 are defined the same as above for the first glass pane 222.

FIG. 12 shows a cross sectional view of the fourth embodiment of the invention. The sash 200 is the same material and is constructed in the same manner as the sash 19 described above. The sash 200 has a hollowed portion 182. This hollowed portion is to reduce the weight and cost of the fenestration unit 170. However, the invention is not limited to the particular shape of the hollowed portion 182 shown in FIG. 12 and in fact it is within the scope of this invention to use a solid sash 200 without a hollow portion 182. The sash includes a first receiving surface 202 which is generally flat but including a stop 204 which is portion of the first receiving surface that is raised above the generally flat portion of the first receiving surface 202. The sash 200 also includes a second receiving surface 206 which is generally flat but includes a stop 208. The sash 200 also includes an interior surface 210 which is located between the first receiving surface 202 and the second receiving surface 206.

A vapor barrier 212 which is the same as the vapor barrier 82 is located in contact with the interior surface 210. The vapor barrier 212 includes a first leg 214, a second leg 216 and an interior portion 218. The first leg 214 is in contact with a portion of the first receiving surface 202 as shown in FIG. 12. The second leg 216 is in contact with a portion of the second receiving surface 206 also as shown in FIG. 12. The first leg 214 and the second leg 216 extend up to the respective stops 204 and 208. The interior portion 218 is in contact with the interior surface 210 of the sash 200. The purpose of this vapor barrier 212 is the same as for the first two embodiments of this invention and it is attached to the sash by the same methods described for those other embodiments.

A desiccant material 184 is located on the interior surface 218 of the vapor barrier 212. A plug 186 is shown exploded out from the hole 188. The plug 186 fits into the hole 188 and serves the same purpose as the plugs and holes in the earlier described embodiments.

A first secondary sealant 220 is located between the inside surface 221 of the first glass pane 222 and the first receiving surface 202. The first secondary sealant 220 is the same as the first secondary sealant discussed above with respect to the first two embodiments of this invention. A first primary sealant 224 is located between the first leg 214 of the vapor barrier 212 and the first glass pane 222. The first primary sealant 224 is the same as the first primary sealants in the first two embodiments of this invention.

A second secondary sealant 226 is located between the inside surface 228 of the second glass pane 230 and the second receiving surface 206. The second secondary sealant 226 is the same as the first secondary sealant 220. A second primary sealant 232 is located between the second leg 216 of the vapor barrier 212 and the second glass pane 230. The second primary sealant 232 is the same as the first primary sealant 224. The stops 204 and 208 serve the same function as the stop 41 in the first embodiment.

The upper glazing bead 175 is an aesthetic piece which hides the second secondary sealant 226 and the second primary sealant 232 from view of an observer. Likewise, the lower glazing bead 177 hides the first secondary sealant 220 and the first primary sealant 224 from view of an observer. The tips 190 and 192 of the glazing beads 177 and 175 are flexible so that the tips can be pressed tightly against the outside surfaces of the glass panes. The glazing beads 177 and 175 may also apply some pressure to the outside surfaces of the first and second glass panes 222 and 230 respectively. This pressure may assist in holding the glass panes in place while the sealants 220, 224, 226 and 232 are curing.

Resilient setting blocks may be used in this fourth embodiment as well as in the prior embodiments. One setting block would be located between the edge 176 and the sash and the other block would be located between the edge 179 of the second glass pane 230 and the sash.

The manufacturing steps in this fourth embodiment are the same as for the first embodiment with one exception. The first glass pane is positioned on the sash 200 differently in that the border portion 174 of the inside surface 221 of the first glass pane 222 is placed on the first receiving surface 202. The first glass pane 222 may be placed on a support structure to hold the first glass pane in contact with the sealants and the first receiving surface. Such a support could be a table or other structure. Alternatively, a fast curing sealant or hot melt can be used as the first secondary sealant 220 to allow the first glass pane 222 to be quickly adhered to the first receiving surface 202.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A fenestration unit comprising:
   a first glass pane having an inside surface and an outside surface, the inside surface having a border portion and an inner portion and the outside surface having a border portion and an inner portion;
   a second glass pane having an inside surface and an outside surface, the outside surface having a border portion and an inner portion, and the inside surface having a border portion and an inner portion, and the inside surface of the first glass pane facing the inside surface of the second glass pane; and a support structure comprising:
  a first receiving surface for receiving the border portion of the first glass pane, wherein the first glass pane is structurally supported solely at the border portion of the outside surface of the first glass pane; and
  a second receiving surface for receiving the border portion of the second glass pane, wherein the border portion of the inside surface of the second glass pane is structurally supported by the second receiving surface.

2. The fenestration unit of claim 1, wherein the first glass pane is attached to the first receiving surface by a first secondary sealant and the second glass pane is attached to the second receiving surface by a second secondary sealant.

3. The fenestration unit of claim 2 wherein the support structure further comprises an interior surface, between the first receiving surface and the second receiving surface, wherein there is a space between the first glass pane and the second glass pane, and the fenestration unit further comprises a vapor barrier located adjacent to the interior surface of the support structure to prevent outgassing from the support structure into the space.

4. The fenestration unit of claim 3 wherein the first secondary sealant and the second secondary sealant are a silicone sealant.

5. The fenestration unit of claim 3 wherein the vapor barrier is attached to the interior surface of the support structure by an adhesive.

6. The fenestration unit of claim 3 wherein the vapor barrier is made of metal.

7. The fenestration unit of claim 6 wherein the vapor barrier is stainless steel.

8. The fenestration unit of claim 6 wherein the vapor barrier is aluminum.

9. The fenestration unit of claim 3 wherein the vapor barrier is a coating that is sprayed onto the interior surface of the support structure.

10. The fenestration unit of claim 3 wherein the vapor barrier is plastic.

11. The fenestration unit of claim 3 wherein the vapor barrier is ceramic.

12. The fenestration unit of claim 3 wherein the vapor barrier is attached to the first receiving surface and the second receiving surface.

13. The fenestration unit of claim 12 wherein a first primary sealant is located between the vapor barrier and the first glass pane and a second primary sealant is located between the vapor barrier and the second glass pane.

14. The fenestration unit of claim 13 wherein the first primary sealant and the second primary sealant are polyisobutylene.

15. A fenestration unit comprising:
  a first glass pane having an inside surface and an outside surface, the inside surface having a border portion and an inner portion and the outside surface having a border portion and an inner portion;
  a second glass pane having an inside surface and an outside surface, the outside surface having a border portion and an inner portion, and the inside surface having a border portion and an inner portion, and the inside surface of the first glass pane facing the inside surface of the second glass pane; and
  a support structure comprising:
    a first receiving surface for receiving the border portion of the outside surface of the first glass pane, and a first secondary sealant located between the first receiving surface and the border portion of the outside surface of the first glass pane, wherein the first glass pane is structurally supported solely at the border portion of the outside surface of the first glass pane; and
    a second receiving surface for receiving the border portion of the inside surface of the second glass pane, and a second secondary sealant located between the second receiving surface and the border portion of the inside surface of the second glass pane, wherein the second glass pane is structurally supported solely at the border portion of the inside surface of the second glass pane.

16. The fenestration unit of claim 15 wherein the first secondary sealant and the second secondary sealant are a silicone sealant.

17. The fenestration unit of claim 15 wherein the first receiving surface comprises a generally flat portion and a lip which protrudes from the flat portion thereby creating a gap between the first glass pane and the flat portion of the first receiving surface wherein the first secondary sealant is substantially contained within the gap.

18. The fenestration unit of claim 15 wherein the second receiving surface comprises a generally flat portion and a stop which protrudes from the flat portion and is generally perpendicular to the flat portion thereby creating a gap between the second glass pane and the flat portion of the second receiving surface wherein the second secondary sealant is substantially contained within the gap.

19. The fenestration unit of claim 15 wherein the support structure further comprises an interior surface, between the first receiving surface and the second receiving surface, wherein there is a space between the first glass pane and the second glass pane, and the fenestration unit further comprises a vapor barrier located adjacent to the interior surface of the support structure to prevent outgassing from the support structure into the space.

20. The fenestration unit of claim 19 wherein the vapor barrier is attached to the interior surface by an adhesive.

21. The fenestration unit of claim 19 wherein the vapor barrier is attached to at least a portion of the first receiving surface and at least a portion of the second receiving surface.

22. The fenestration unit of claim 21 wherein a first primary sealant is located between the vapor barrier and the first glass pane and a second primary sealant s located between the vapor barrier and the second glass pane.

23. The fenestration unit of claim 22 wherein the first primary sealant and the second primary sealant are polyisobutylene.

24. The fenestration unit of claim 23 wherein the first receiving surface further comprises a stop which protrudes from the flat portion and is generally perpendicular to the flat portion thereby separating the first primary sealant from the first secondary sealant.

25. A fenestration unit comprising:
  a first glass pane having an inside surface and an outside surface, the inside surface having a border portion and an inner portion and the outside surface having a border portion and an inner portion;
  a second glass pane having an inside surface and an outside surface, the outside surface having a border portion and an inner portion, and the inside surface having a border portion and an inner portion, and the inside surface of the first glass pane facing the inside surface of the second glass pane; and
  a support structure comprising:
    a first receiving surface for receiving the border portion of the first glass pane, wherein the first glass pane is structurally supported solely at the border portion of the outside surface of the first glass pane; and a second receiving surface for receiving the border portion of the second glass pane, wherein the second glass pane is structurally supported solely at the border portion of the inside surface of the second glass pane.

26. A fenestration unit comprising:

a first glass pane having an inside surface and an outside surface, the inside surface having a border portion and an inner portion and the outside surface having a border portion and an inner portion;

a second glass pane having an inside surface and an outside surface, the outside surface having a border portion and an inner portion, and the inside surface having a border portion and an inner portion, and the inside surface of the first glass pane facing the inside surface of the second glass pane; and a support structure comprising:
  a first receiving surface for receiving the border portion of the first glass pane, wherein the first glass pane is structurally supported at the border portion of the outside surface of the first glass pane; and
  a second receiving surface for receiving the border portion of the second glass pane, wherein the second glass pane is structurally supported at the border portion of the inside surface of the second glass pane, wherein there is no spacer between the first glass pane and the second glass pane.

* * * * *